(12) United States Patent
Lee et al.

(10) Patent No.: US 12,227,921 B2
(45) Date of Patent: Feb. 18, 2025

(54) SYSTEM AND METHOD OF CONTROLLING CONSTRUCTION MACHINERY

(71) Applicant: HD HYUNDAI INFRACORE CO., LTD., Incheon (KR)

(72) Inventors: Cavin Lee, Yongin-si (KR); Kwangseok Park, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 12 days.

(21) Appl. No.: 17/875,877

(22) Filed: Jul. 28, 2022

(65) Prior Publication Data

US 2023/0035181 A1  Feb. 2, 2023

(30) Foreign Application Priority Data

Jul. 28, 2021 (KR) .................. 10-2021-0099121
Jul. 6, 2022 (KR) .................. 10-2022-0083368

(51) Int. Cl.
*G06V 20/58* (2022.01)
*B60R 1/24* (2022.01)
(Continued)

(52) U.S. Cl.
CPC .......... *E02F 9/261* (2013.01); *B60R 1/24* (2022.01); *E02F 9/24* (2013.01); *E02F 9/264* (2013.01);
(Continued)

(58) Field of Classification Search
CPC ......... E02F 9/0841; E02F 9/261; E02F 9/264; B60R 1/24; B60R 2300/105;
(Continued)

(56) References Cited

U.S. PATENT DOCUMENTS

| 2015/0116495 A1* | 4/2015 | Kowatari | .............. H04N 7/181 |
| | | | 348/148 |
| 2021/0206330 A1* | 7/2021 | Lee | ........................ E02F 9/26 |
| 2022/0220705 A1* | 7/2022 | Lee | ..................... H04N 23/90 |

FOREIGN PATENT DOCUMENTS

| CN | 114080481 A * | 2/2022 | ............ B66C 13/46 |
| EP | 3 385 458 A1 | 10/2018 | |

(Continued)

OTHER PUBLICATIONS

The extended European Search Report dated Jan. 17, 2023 for corresponding European Patent Application No. 22187518.0, 8 pages.

*Primary Examiner* — Chante E Harrison
(74) *Attorney, Agent, or Firm* — Hauptman Ham, LLP

(57) ABSTRACT

A control system for construction machinery includes an upper camera installed in a driver cabin of a rear vehicle body to photograph the front of the driver cabin, a lower camera installed in a front vehicle body rotatably connected to the rear vehicle body to photograph the front of the front vehicle body, an angle information detection portion configured to detect information on a refraction angle of the front vehicle body with respect to the rear vehicle body, an image processing device configured to synthesize first and second images captured from the upper and lower cameras, and configured to determine a position of a transparency processing area in the synthesized image according to the refraction angle information and transparency-process at least one of the first and second images in the transparency processing area, and a display device configured to display the synthesized image transparency-processed by the image processing device.

25 Claims, 10 Drawing Sheets

(51) Int. Cl.
  *E02F 9/24* (2006.01)
  *E02F 9/26* (2006.01)
  *G06T 11/00* (2006.01)
  *H04N 5/262* (2006.01)
  *H04N 5/265* (2006.01)
  *H04N 23/90* (2023.01)

(52) U.S. Cl.
  CPC .............. *G06T 11/00* (2013.01); *G06V 20/58* (2022.01); *H04N 5/2628* (2013.01); *H04N 5/265* (2013.01); *H04N 23/90* (2023.01); *B60R 2300/105* (2013.01); *B60R 2300/302* (2013.01); *B60R 2300/8093* (2013.01); *G06T 2210/22* (2013.01); *G06T 2210/62* (2013.01)

(58) Field of Classification Search
  CPC ...... B60R 2300/302; B60R 2300/8093; G06T 11/00; G06T 2210/62; G06T 2210/06; G06T 19/006; G06V 20/58; H04N 5/265
  See application file for complete search history.

(56) References Cited

FOREIGN PATENT DOCUMENTS

| | | | | |
|---|---|---|---|---|
| EP | 3 848 516 A1 | | 7/2021 | |
| EP | 4 029 998 A1 | | 7/2022 | |
| JP | 6913630 B2 | * | 8/2021 | ................ E02F 9/26 |
| KR | 20170108124 A | * | 9/2017 | |
| KR | 20210034064 A | * | 3/2021 | |
| KR | 20210034449 A | * | 3/2021 | |
| KR | 20210034450 A | * | 3/2021 | |
| KR | 20210089039 A | * | 7/2021 | |
| KR | 20220102804 A | * | 7/2022 | |
| KR | 20230017724 A | * | 2/2023 | |
| KR | 20240056273 A | * | 4/2024 | |
| WO | WO-2020003631 A1 | * | 1/2020 | .............. E02F 9/205 |
| WO | 2021/054756 A1 | | 3/2021 | |
| WO | WO-2021054757 A1 | * | 3/2021 | |
| WO | WO-2021054758 A1 | * | 3/2021 | |
| WO | WO-2024085732 A1 | * | 4/2024 | |

* cited by examiner

SYSTEM AND METHOD OF CONTROLLING CONSTRUCTION MACHINERY

PRIORITY STATEMENT

This application claims priority under 35 U.S.C. § 119 to Korean Patent Application No. 10-2021-0099121 and Korean Patent Application No. 10-2022-0083368, respectively filed on Jul. 28, 2021 and Jul. 6, 2022 in the Korean Intellectual Property Office (KIPO), the contents of which are herein incorporated by reference in their entirety.

BACKGROUND

1. Field

Example embodiments relate to a control system and method for construction machinery. More particularly, example embodiments relate to a control system for recognizing forward obstacles when working or driving construction machinery such as a wheel loader, an excavator, etc., and a method of controlling construction machinery using the same.

2. Description of the Related Art

In general, construction machinery such as a wheel loader, an excavator, etc., is widely used to excavate sand, gravel, and the like and load it into a dump truck. These works may be performed by driving a work apparatus installed in the construction machinery such as a bucket and a boom. However, the work apparatus may obstruct or limit an operator's front view while driving or traveling, and thus, obstruction of the operator's front view by the work apparatus may cause a safety accident.

SUMMARY

Example embodiments provide a control system for construction machinery capable of improving forward visibility limited by a work apparatus.

Example embodiments provide a control method for construction machinery using the control system.

According to example embodiments, a control system for construction machinery includes an upper camera installed in a driver cabin of a rear vehicle body to photograph the front of the driver cabin, a lower camera installed in a front vehicle body rotatably connected to the rear vehicle body to photograph the front of the front vehicle body, an angle information detection portion configured to detect information on a refraction angle of the front vehicle body with respect to the rear vehicle body, an image processing device configured to synthesize first and second images captured from the upper camera and the lower camera into one image, and configured to determine a position of a transparency processing area in the synthesized image according to the refraction angle information and transparency-process at least one of the first and second images in the transparency processing area, and a display device configured to display the synthesized image transparency-processed by the image processing device.

In example embodiments, the image processing device may include a steering angle calculator configured to determine a steering hinge angle of the front vehicle body from the refraction angle information obtained by the angle information detection portion, and a transparency processor configured to determine the position of the transparency process area in the synthesized image according to the determined steering hinge angle.

In example embodiments, the steering angle calculator may convert a detection value obtained from the angle information detection portion into the steering hinge angle value of the front vehicle body.

In example embodiments, the angle information detection portion may include a center pin angle sensor, a steering cylinder displacement sensor or a gyro sensor.

In example embodiments, the control system may further include a work apparatus posture detection portion configured to detect a posture of a front work apparatus, and the image processing device may transparency-process the at least one of the first and second images in the synthesized image according to the posture of the front work apparatus detected by the work apparatus posture detection portion.

In example embodiments, the image processing device may transparency-process the first image in the synthesized image when at least a portion of the front work apparatus invades a predetermined position, and the image processing device transparency-processes the second image in the synthesized image when the work apparatus does not invade the predetermined position In example embodiments, the control system may further include an input portion configured to set an image processing condition in the image processing device.

In example embodiments, the image processing condition may include a transparency processing switching timing of the first and second images or the transparency processing area of the entire display area of the display device.

In example embodiments, the image processing device may process that, in the transparency processing area, an outline of an exterior of a boom or a bucket of the transparency-processed first and second images is displayed with a line or a dotted line.

In example embodiments, the outline of the transparency-processed boom or bucket may be displayed by transparency-processing an image of the boom or bucket that is taken from the first image or the second image.

In example embodiments, the image processing device may selectively transparency-processes an image of a boom or a bucket coupled to the front vehicle body in the first and second images in the transparent processing area.

In example embodiments, the synthesized image may include an object recognized by the image processing device in the first image and the second image.

In example embodiments, the image processing device may recognize a person, animal, building or equipment as an object through a predetermined algorithm.

In example embodiments, the image processing device may extract a crop image from any one of the first and second images, may transparency-process a partial region in the other one of the first and second images, and may place the extracted crop image in the transparency-processed region to create the synthesized image.

In example embodiments, the transparency-processed region may correspond to the transparency processing area.

In example embodiments, the image processing device may set a portion of the first image as a first synthesis region, may set a portion of the second image as a second synthesis region, may translucently process the second synthesis region of the second image, and may synthesizes the translucently processed second synthesis region with the first synthesis region of the first image to create the synthesized image.

According to example embodiments, in a method of controlling construction machinery, a first image of the front of a driver cabin is obtained from an upper camera installed in the drive cabin of a rear vehicle body. A second image of the front of a front vehicle body is obtained from a lower camera installed in the front vehicle body rotatably connected to the rear vehicle body. Information on a refraction angle of the front vehicle body with respect to the rear vehicle body is obtained. The first and second images are synthesized into one image. A position of a transparency processing area in the synthesized image is determined according to the obtained refraction angle information. At least one of the first and second images in the transparency processing area is transparency-processed. The transparency-processed image is displayed through a display device.

In example embodiments, determining the position of the transparency processing area according to the obtained refraction angle information may include determining a steering hinge angle of the front vehicle body from the refraction angle information, and determining the position of the transparency process area in the synthesized image according to the determined steering hinge angle.

In example embodiments, determining the steering hinge angle of the front vehicle body from the refraction angle information may include converting a refraction angle detection value into the steering hinge angle value of the front vehicle body.

In example embodiments, obtaining the refraction angle information of the front vehicle body with respect to the rear vehicle body may include using a refraction angle detection sensor, and the refraction angle detection sensor includes a center pin angle sensor, a steering cylinder displacement sensor or a gyro sensor.

In example embodiments, the method may further include detecting a posture of a front work apparatus, and transparency-processing the at least one of the first and second images in the transparency processing area may include transparency-processing the at least one of the first and second images in the synthesized image according to the detected posture of the front work apparatus.

In example embodiments, the method may further include setting an image processing condition under which the at least one of the first and second images is transparency processed.

In example embodiments, the image processing condition may include a transparency processing switching timing of the first and second images or the transparency processing area of the entire display area of the display device.

According to example embodiments, in a method of controlling construction machinery, a first image of the front of a driver cabin is obtained from an upper camera installed in the drive cabin of a rear vehicle body. A second image of the front of a front vehicle body is obtained from a lower camera installed in the front vehicle body rotatably connected to the rear vehicle body. Information on a refraction angle of the front vehicle body with respect to the rear vehicle body is obtained. A position of a transparency processing area in the first image is determined according to the obtained refraction angle information. A crop image is extracted by setting a partial region in the second image corresponding to the transparency processing area as a crop region. Transparency of the transparency processing area of the first image is adjusted. The crop image extracted from the second image is synthesized to the transparency processing area of the first image. The synthesized image is displayed through a display device.

In example embodiments, synthesizing the extracted cropped image to the transparency processing area of the first image may include adjusting a size of the crop image extracted from the second image, and synthesizing the adjusted crop image to the transparency processing area of the first image.

In example embodiments, adjusting the transparency of the transparency processing area of the first image may include processing such that an outline of an exterior of a boom or a bucket is displayed with a line or a dotted line in the transparency processing area of the first image.

In example embodiments, the method may further include recognizing a person, animal, building or equipment as an object through a predetermined algorithm in the synthesized image.

According to example embodiments, a control device for construction machinery may synthesize a first image and a second image captured from an upper camera installed in a driver cabin and a lower camera installed in a front vehicle body into one image, determine a position of a transparency processing area in the synthesized image according a steering hinge angle of the front vehicle body, transparency-process at least one of the first and second images to be transparent in the transparency processing area according to a position of a bucket or a boom connected to the front vehicle body, and display the transparency-processed image through a display device.

That is, the position of the transparency processing area in the synthesized image may be determined to be matched to the steering hinge angle of the front vehicle body, and the at least one of the first image and the second image may be transparency-processed in the transparency processing area according to the posture of the work apparatus such as a position of the bucket, to remove a blind spot that is obscured by the front work apparatus. Thus, an operator's cognitive ability may be increased to secure stability, to thereby prevent safety accidents.

Further, the transparency processing area may be set according to the operator's selection, thereby improving the degree of freedom in using the transparency processed image, and an efficient system configuration may be provided.

However, the effect of the inventive concept may not be limited thereto, and may be expanded without being deviated from the concept and the scope of the present invention.

BRIEF DESCRIPTION OF THE DRAWINGS

Example embodiments will be more clearly understood from the following detailed description taken in conjunction with the accompanying drawings.

DETAILED DESCRIPTION OF EXAMPLE EMBODIMENTS

Figure 1:
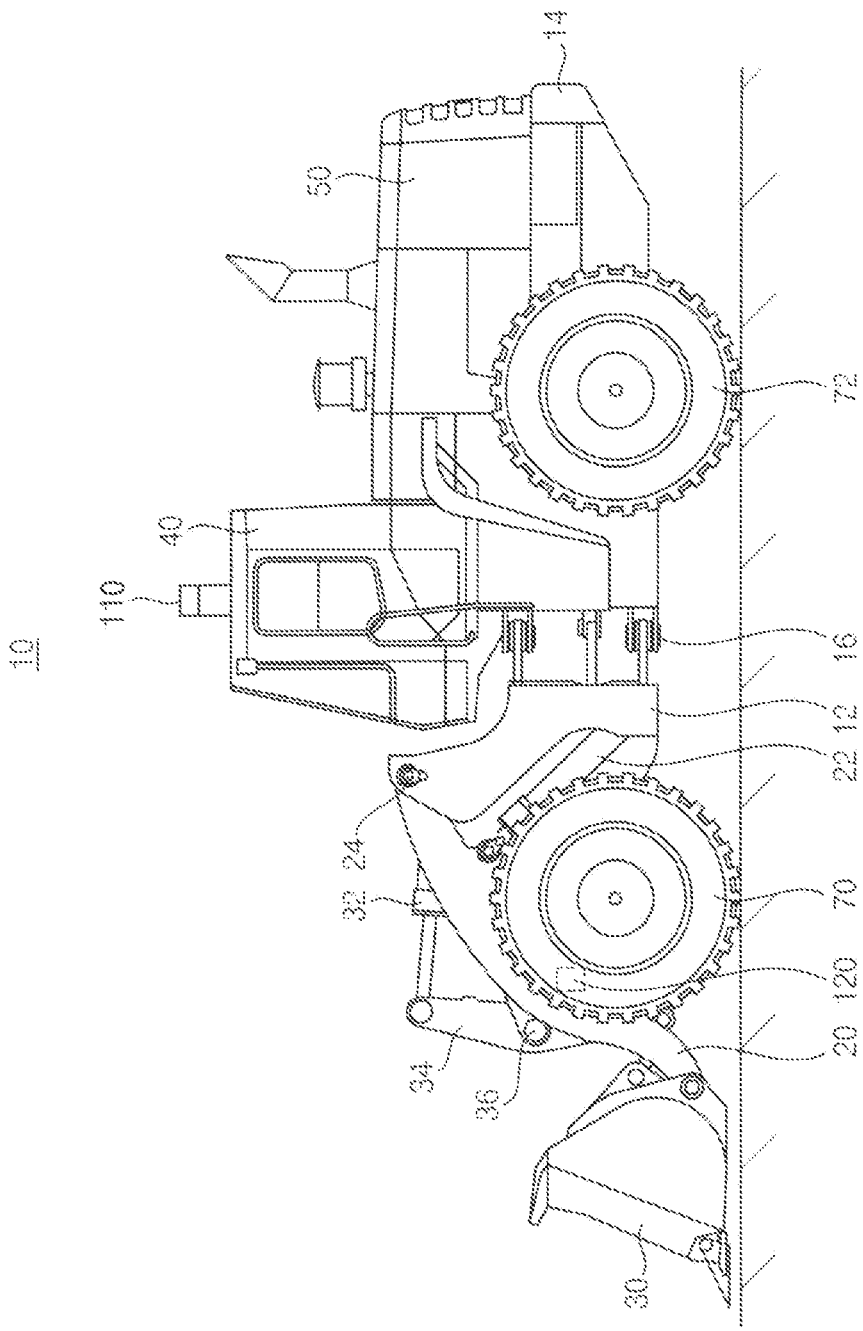
FIG. 1 is a side view illustrating construction machinery in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

FIG. 1 is a side view illustrating construction machinery in accordance with example embodiments. Although a wheel loader 10 is illustrated in FIG. 1, a control device of construction machinery according to example embodiments is not limited to being used only in the wheel loader, but may be applied to an industrial vehicle such as an excavator, a forklift, etc. Hereinafter, for convenience of description, only the wheel loader 10 will be described.

Referring to FIG. 1, construction machinery 10 may include a vehicle body 12, 14, a driver cabin 40, and a front work apparatus. The vehicle body of the wheel loader 10 in FIG. 1 may include, for example, a front vehicle body 12 and a rear vehicle body 14 rotatably connected to each other. The front vehicle body 12 may include the front work apparatus and a front wheel 70. The rear vehicle body 14 may include the driver cabin 40, an engine bay 50 and a rear wheel 72.

The front work apparatus may include a boom 20 and a bucket 30. The boom 20 may be freely pivotally attached to the front vehicle body 12, and the bucket 30 may be freely pivotally attached to an end portion of the boom 20. The boom 20 may be coupled to the front vehicle body 12 by a pair of boom cylinders 22, and the boom 20 may be pivoted upwardly and downwardly by expansion and contraction of the boom cylinders 22. A tilt arm 34 may be freely rotatably supported on the boom 20, almost at its central portion. One end portion of the tilt arm 34 may be coupled to the front vehicle body 12 by a pair of bucket cylinders 32 and another end portion of the tilt arm 34 may be coupled to the bucket 30 by a tilt rod, so that the bucket 30 may pivot (crowd and dump) as the bucket cylinders 32 expand and contract.

Additionally, the front vehicle body 12 and the rear vehicle body 14 may be rotatably connected to each other through a center pin 16 so that the front vehicle body 12 may swing side to side with respect to the rear vehicle body 14 by expansion and contraction of a steering cylinder (not illustrated).

A travel apparatus for propelling the wheel loader 10 may be mounted at the rear vehicle body 14. An engine (not illustrated) may be provided in the engine bay to supply an output power to the travel apparatus. The travel apparatus may include a torque converter, a transmission, a propeller shaft, axles, etc. The output power of the engine may be transmitted to the front wheel 70 and the rear wheel 72 through the torque converter, the transmission, the propeller shaft and the axles, and thus the wheel loader 10 may travels.

A hydraulic pump (not illustrated) for supplying a pressurized hydraulic oil to the boom cylinder 22 and the bucket cylinder 32 of the work apparatus may be mounted at the rear vehicle body 14. The hydraulic pump may be driven using at least a portion of the power outputted from the engine. For example, the output power of the engine may drive the hydraulic pump for the work apparatus and a hydraulic pump for the steering cylinder via a power transmission device such as a gear train.

The hydraulic pump may supply the hydraulic oil to drive the working device, and may be divided into a variable capacity type and a constant capacity type. A pump control device (EPOS, Electronic Power Optimizing System) may be connected to the variable capacity hydraulic pump, and an amount of the hydraulic oil discharged from the variable capacity hydraulic pump may be controlled by the pump control device. A main control valve (MCV) including a boom control valve and a bucket control valve may be installed on a hydraulic circuit connected to the hydraulic pump. The hydraulic oil discharged from the hydraulic pump may be supplied to the boom cylinder 22 and the bucket cylinder 32 through the boom control valve and the bucket control valve of the main control valve MCV. The main control valve (MCV) may supply the hydraulic oil discharged from the hydraulic pump to the boom cylinder 22 and the bucket cylinder 32 according to a pilot pressure signal in proportion to an operation rate of an operating lever. Thus, the boom 20 and the bucket 30 may be driven by the pressure of the hydraulic oil discharged from the hydraulic pump.

The driver cabin 40 may be installed on the vehicle body of the construction machinery, and in case of the wheel loader, the drive cabin 40 may be installed on the rear vehicle body 14. A maneuvering device may be provided within the driver cabin 40. The maneuvering device may include an acceleration pedal, a brake pedal, an FNR travel lever, the operating levers for operating cylinders such as the boom cylinder 22 and the bucket cylinder 32, etc.

As mentioned above, the wheel loader 10 may include a traveling operating system for driving the travel apparatus via the power transmission device and a hydraulic operating system for driving the work apparatus such as the boom 20 and the bucket 30 using the output power of the engine 100.

Hereinafter, a control system for the construction machinery will be explained using the wheel loader as an example.

Figure 2:
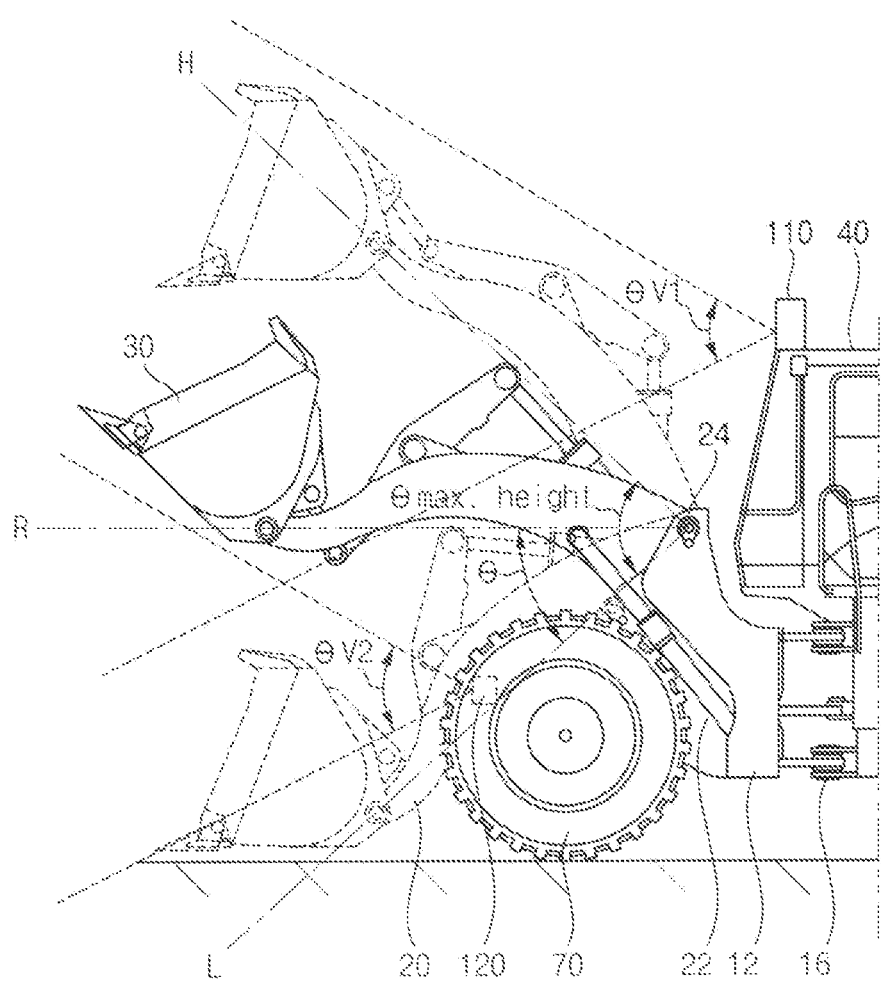
FIG. 2 is a side view illustrating bucket elevation positions according to rotation angles of a boom in FIG. 1.
Figure 3:
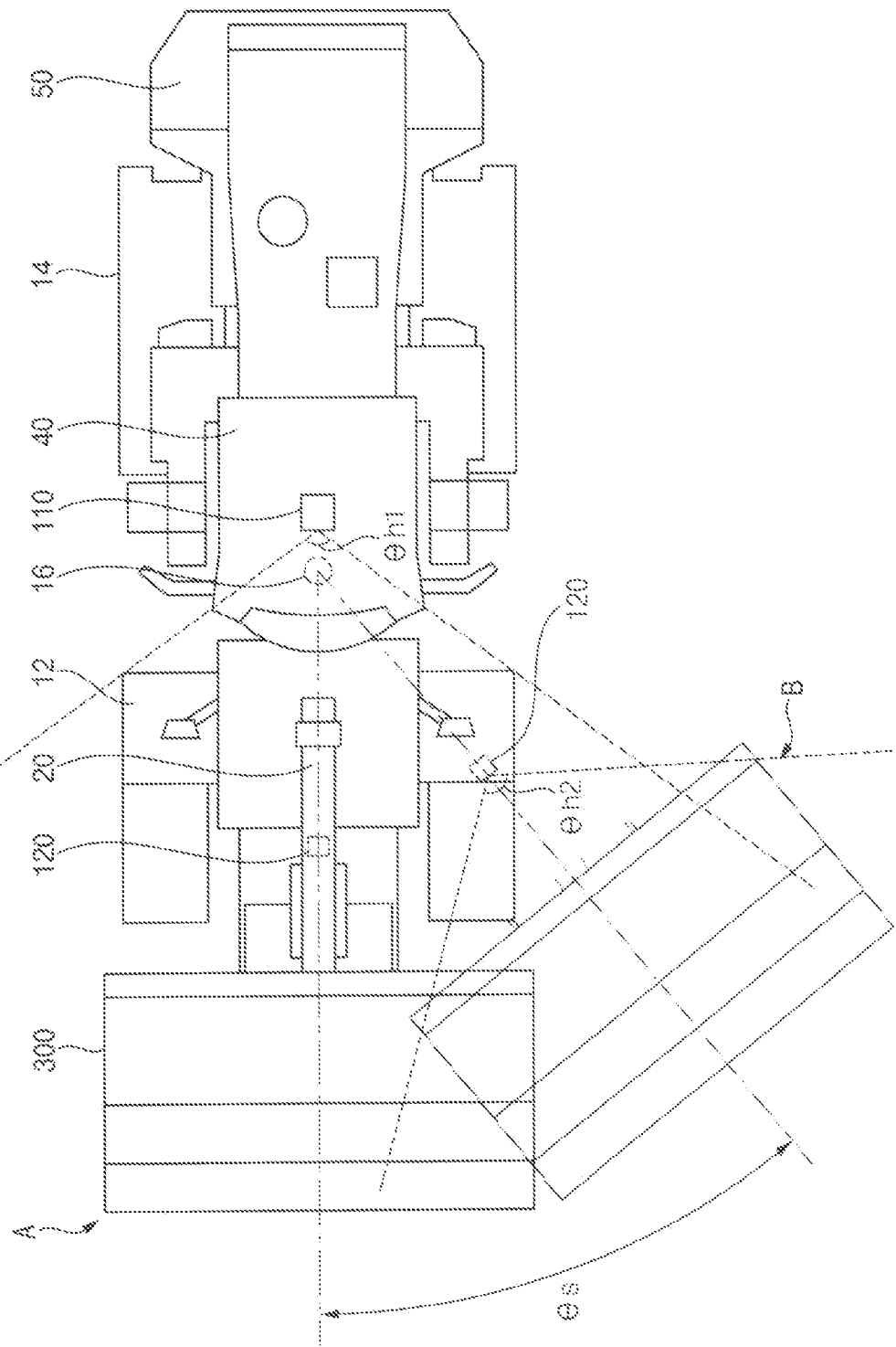
FIG. 3 is a plan view illustrating horizontal viewing angles of an upper camera and a lower camera when the construction machinery of FIG. 1 travels straight ahead and turns left.
Figure 4:
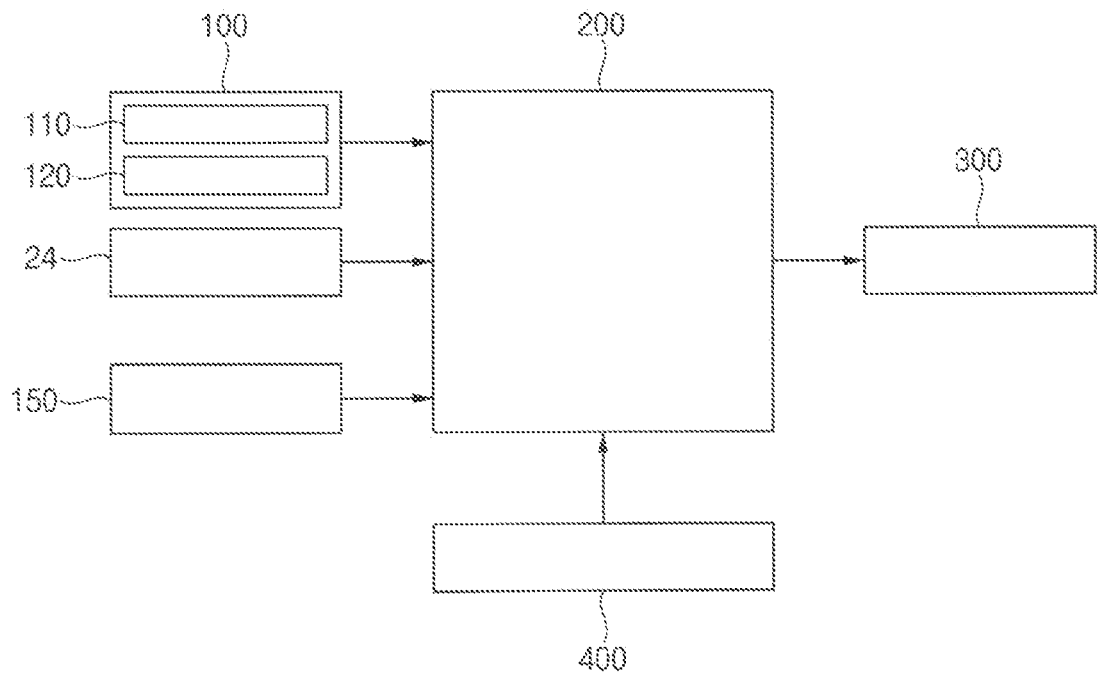
FIG. 4 is a block diagram illustrating a control system for the construction machinery in FIG. 1.
Figure 5:
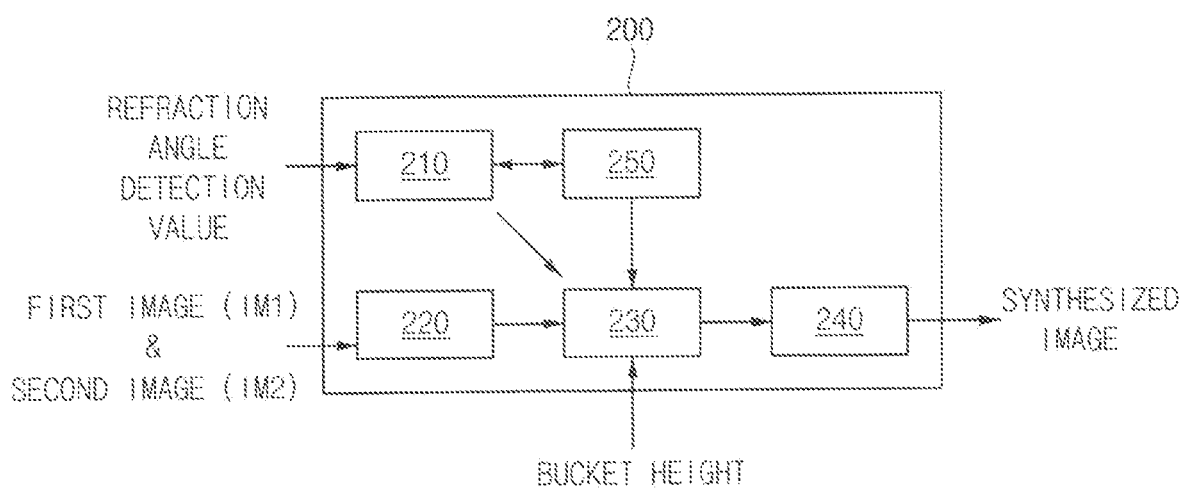
FIG. 5 is a block diagram illustrating an image processing device in FIG. 4.
Figure 6:
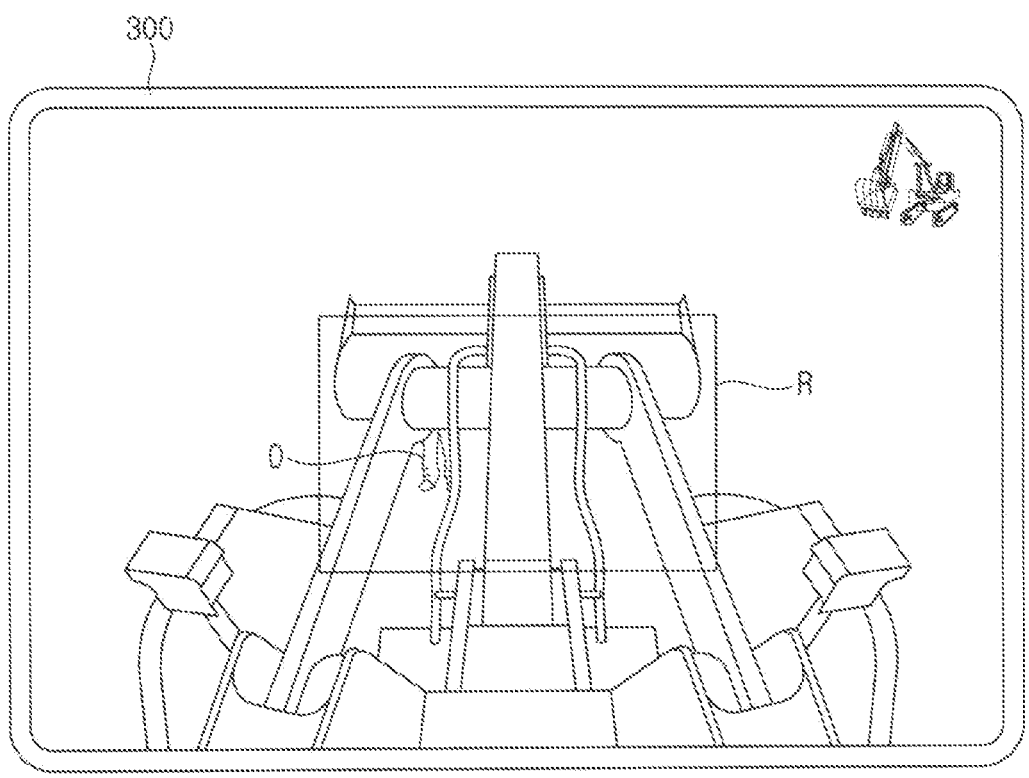
FIG. 6 is a view illustrating a first image captured by the upper camera.
Figure 7:
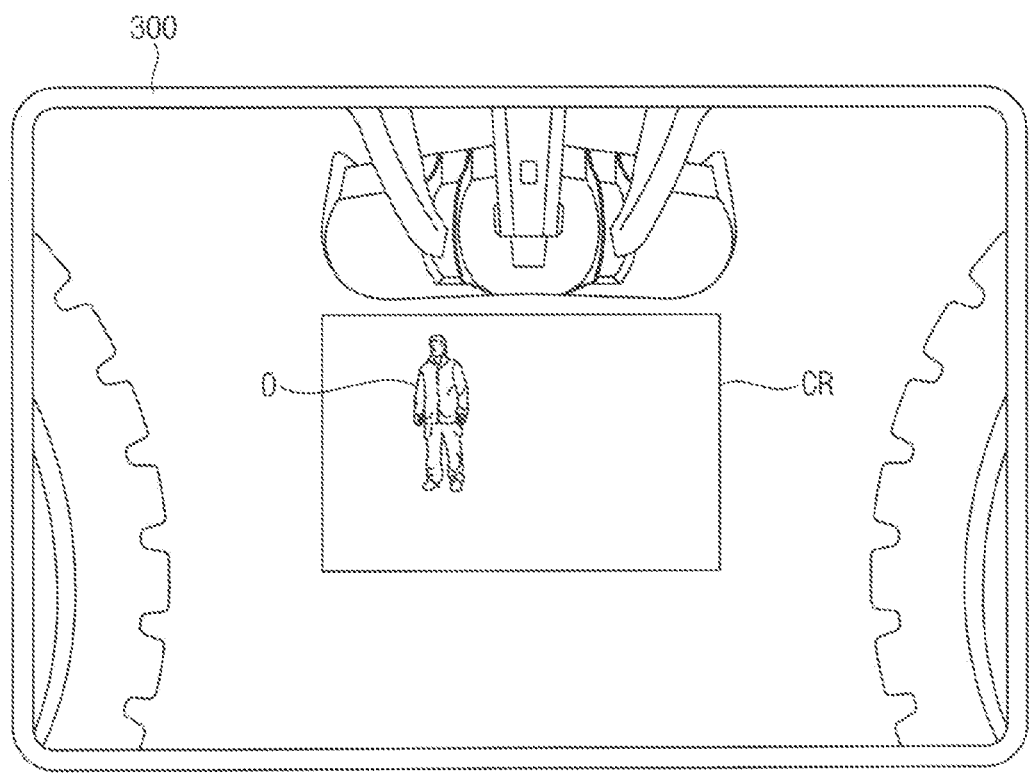
FIG. 7 is a view illustrating a second image captured by the lower camera.
Figure 8:
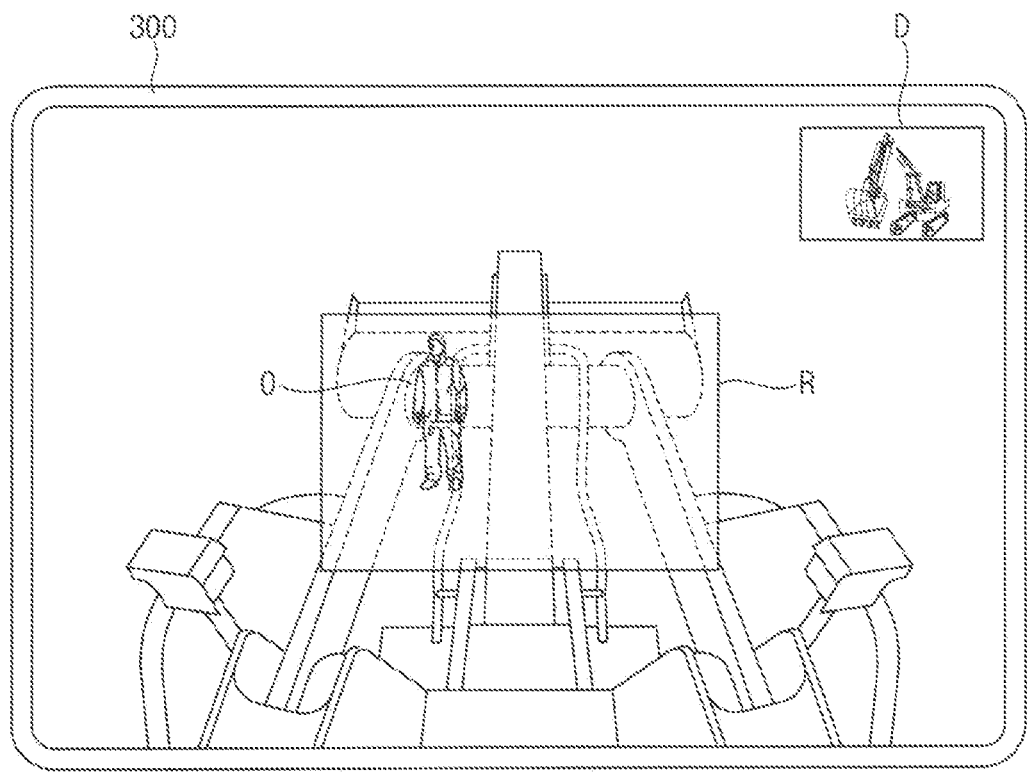
FIG. 8 is a view illustrating an image in which the first image of FIG. 6 and the second image of FIG. 7 are synthesized by the image processing device of FIG. 5.

FIG. 2 is a side view illustrating bucket elevation positions according to rotation angles of a boom in FIG. 1. FIG. 3 is a plan view illustrating horizontal viewing angles of an upper camera and a lower camera when the construction machinery of FIG. 1 travels straight ahead and turns left. FIG. 4 is a block diagram illustrating a control system for the construction machinery in FIG. 1. FIG. 5 is a block diagram illustrating an image processing device in FIG. 4. FIG. 6 is a view illustrating a first image captured by the upper camera. FIG. 7 is a view illustrating a second image captured by the lower camera. FIG. 8 is a view illustrating an image in which the first image of FIG. 6 and the second image of FIG. 7 are synthesized by the image processing device of FIG. 5.

Referring to FIGS. 1 to 8, a control system for the wheel loader may include a camera portion 100 installed in the wheel loader 10 to photograph the front of the wheel loader 10, an angle information detection portion 150 configured to obtain information on refraction angle of the front vehicle body 12, an image processing device 200 configured to process an image from the camera portion 100 in real time, and a display device 300 configured to display the image processed by the image processing device 200. Additionally, the control system for the wheel loader may further include a work apparatus posture detection portion configured to detect a posture of the front work apparatus connected to the front vehicle body 12 and an input portion 400 configured to set an image processing condition in the image processing device 200.

The image processing device 200 for the wheel loader 10 such as a portion of an engine control unit ECU or a vehicle control unit VCU, or a separate control unit may be mounted in the rear vehicle body 14. The image processing device 200 may be implemented with dedicated hardware, software, and circuitry configured to perform the functions described herein. These elements may be physically implemented by electronic circuits such as logic circuits, discrete components, microprocessors, hard-wired circuits, memory elements, wiring connections, and the like.

In example embodiments, the camera portion 100 may monitor the front of the wheel loader 10 when the wheel loader 10 travels or works, and may include a plurality of cameras. In particular, the camera portion 100 may include an upper camera 110 installed in the driver cabin 40 and configured to photograph the front of the driver cabin 40 to capture a first image IM1 and a lower camera 120 installed in the front vehicle body 12 and configured to photograph the front of the front vehicle body 12 to capture a second image IM2. For example, the upper camera and the lower camera may be a fisheye camera having a fisheye lens. Although one upper camera and one lower camera are illustrated in FIGS. 1 and 2, it may not be limited thereto, and a plurality of the upper cameras and a plurality of the lower cameras may be provided.

The upper camera 110 may have a first vertical viewing angle (Field of View, FoV) $\theta v1$ and a first horizontal viewing angle $\theta h1$ based on the front direction of the wheel loader. For example, the first vertical viewing angle and the first horizontal viewing angle may have an angular range of 60 degrees to 120 degrees. The lower camera 120 may have a second vertical viewing angle $\theta v2$ and a second horizontal viewing angle $\theta h2$ based on the front direction of the wheel loader. For example, the second vertical viewing angle and the second horizontal viewing angle may have an angular range of 60 degrees to 120 degrees.

The first image may be an image captured with a focus on a front upper region through the upper camera 110, and the second image may be an image captured with a focus on a front lower region through the second camera 120.

By setting the first vertical viewing angle $\theta v1$ of the upper camera 110 and the second vertical viewing angle $\theta v2$ of the lower camera 120 to partially overlap, the first image and the second image may partially overlap each other.

In example embodiments, the upper camera 110 may be installed to coincide with or to be at the rear of a central axis (steering central axis) of the center pin 16, and the lower camera 120 may be installed to be in the front of the central axis of the center pin 16.

Since the upper camera 110 and the lower camera 120 are installed at different positions with respect to the steering center axis, as illustrated in FIG. 3, when the left (or right) refraction of the front vehicle body 12 is performed, the direction at which the upper camera 110 looks and the direction at which the lower camera 120 looks may be different from each other. As will be described later, the image processing device 200 may synthesize the first image IM1 and the second image IM2 into one image, and at least one of the first image IM1 and the second image IM2 in the synthesized image may be processed such that a position of a transparency processing area in which the at least one image is transparently processed is adjusted to be matched to a steering hinge angle ($\theta s$) of the wheel loader 10.

In example embodiments, the work apparatus posture detection portion may detect whether the front work apparatus invades the transparency processing area in a display area of the display device 300. As described later, transparency processing may be performed on the captured image when the work apparatus invades a predetermined position (position matched to the steering hinge angle), that is, an actual position corresponding to the predetermined transparency processing area among the entire display area of the display device 300, so that an operator's view may be secured. The posture of the front work apparatus may include a position of the bucket 30 (a height of the bucket from the ground) or a posture of the boom 20 (a rotation angle of the boom). To this end, the work apparatus posture detection portion may include a boom angle sensor 24 for detecting the position of the bucket 30 or the posture of the boom 20. In addition, the work apparatus posture detection portion may include a bucket angle sensor (not illustrated) for detecting a relative rotation angle between the boom 20 and the bucket 30. The work apparatus posture detection portion may include a displacement sensor for detecting a stroke of the cylinder driving the boom 20, in place of the boom angle sensor 24.

Further, the work apparatus posture detection portion may include an image analysis device (for example, shape recognition portion) that analyzes an image of the front work apparatus captured through the camera to determine the posture of the front work apparatus.

The boom angle sensor 24 may detect the rotation angle of the boom 20 and provide information on the position of the bucket 30 based on the rotation angle of the boom 20. As illustrated in FIG. 2, the rotation angle of the boom 20 may be an angle θ between an extension line L at the lowest position (0%) of the boom 20 (bucket 30) and an extension line R at an elevated position of the boom 20. The rotation angle of the boom 20 at the highest position of the boom 20 (max boom height) is θmax.height, and in this case, the boom (bucket) position may be the maximum height (100%).

In example embodiments, the angle information detection portion 150 may include a sensor for detecting refraction angle information of the front vehicle body 12 with respect to the rear vehicle body 14 by a steering device. The detection value from the sensor may be transmitted to the image processing device 200 through a CAN network.

For example, the angle information detection portion 150 may include a center pin angle sensor, a steering cylinder displacement sensor, or a gyro sensor. The center pin angle sensor may be installed in the center pin 16 connecting the front vehicle body 12 and the rear vehicle body 14 to detect a steering hinge angle of the front vehicle body 12. The steering cylinder displacement sensor may include a stroke sensor for detecting a stroke of a cylinder inside the steering cylinder. The gyro sensor may include a first sensor and a second sensor installed in the front vehicle body 12 and the rear vehicle body 14 respectively, to recognize absolute angles of 6 or more axes, and may detect relative angles between the first and second sensors to recognize the steering hinge angle.

In example embodiments, the image processing device 200 may synthesize the first image IM1 and the second image IM2 captured by the upper camera 110 and the lower camera 120 into one image, may determine the steering hinge angle of the front vehicle body 12 from the angle information of the angle information detection portion 150, and may determine the position of the transparency processing area in which at least one of the first and second images in the synthesized image is transparency-processed according to the steering hinge angle. The image processing device 200 may include a steering angle calculator 210, an image synthesizer 220, a transparency processor 230, an image rendering portion 240 and a storage portion 250. The image processing device 200 may be installed in the form of a control device embedded in the control device or the display device of the construction machinery.

In particular, the steering angle calculator 210 may determine the steering hinge angle θs of the front vehicle body 12 from the refraction angle information detected by the angle information detection portion 150. The steering angle calculator 210 may convert the detection value from the angle information detection portion 150 into the steering hinge angle using a conversion table stored in the storage portion 250.

The image synthesizer 220 may synthesize the first image IM1 and the second mage IM2 into one image. The image synthesizer 220 may match the first image and the second image captured by the upper camera 110 and the lower camera 120 to find portions of images that overlap (are duplicated) in the first and second images and match the overlapping portions of the images into one synthesized image. The transparency processor 220 may transparency-process at least one of the first and second images in the transparency processing area. The image rendering portion 230 may render the image-processed synthetic image into a 3D image. The image rendering portion 230 may process the synthesized image to be displayed like a real image and output the rendering-processed synthesized image to the display device 300. The functions of the image synthesizer 220, the transparency processor 230 and the image rendering portion 240 may be implemented through a single processor such as GP or CPU for image processing, or through computational processing of separate processors.

In example embodiments, the transparency processor 230 may perform transparency processing in response to a case in which at least a portion of the front work apparatus invades a position corresponding to the transparency processing area. When the bucket or boom position is lower than a predetermined position (transparency switching position), which can be determined that the at least a portion of the front work apparatus does not invade the transparency processing area, the second image in the synthesized image may be transparency-processed to be transparent. On the other hand, when the bucket or boom position is higher than the predetermined position (transparency switching position), which can be determined that the at least a portion of the front work apparatus invades the transparency processing area, the first image in the synthesized image may be transparency-processed to be transparent. For example, the predetermined position of the boom may be set such that the rotation angle θ of the boom 20 is within a range of 15 degrees to 20 degrees.

When the bucket 30 is positioned between the lowest position (0%) and the predetermined bucket position, that is, the transparency switching position which is the boundary of the transparency processing area, the second image captured from the lower camera 120 may be transparency-processed, so that an object implemented by the upper camera 110 may be displayed as a main point (focus). In the second image captured from the lower camera 120, when the bucket 30 is in a relatively low position, the front view of the front vehicle body 12 may be obscured by the front work apparatus including the boom 20 and the bucket 30. The transparency processor 220 may process the second image to be transparent and display the first image as a focus to thereby prevent the front view from being obscured by the front work apparatus.

When the bucket 30 is positioned between the predetermined bucket position and the highest position (100%) of the transparency processing area, the first image captured from the upper camera 110 may be transparency-processed, so that an object implemented by the lower camera 120 may be displayed as a main point (focus). In the first image captured from the upper camera 110, when the bucket 30 is in a relatively high position, the front view of the front vehicle body 12 may be obscured by the front work apparatus including the boom 20 and the bucket 30. The transparency processor 220 may process the first image to be transparent and display the second image as a focus to thereby prevent the front view from being obscured by the front work apparatus.

When the bucket 30 is lifted or lowered to pass through the predetermined bucket position (transparency switching position), an image located in the transparency processing area transparency-processed by the transparency processor 220 may be converted from the second image to the first image or from the first image to the second image.

Alternatively, the transparency processor 230 may transparency-process the second image in the synthesized image to be transparent when the rotation angle θ of the boom is within a first angle range, transparency-process the first and second images in the transparency processing area of the synthesized image to be transparent when the rotation angle θ of the boom is within a second angle range, and transparency-process the first image in the synthesized image to be transparent when the rotation angle θ of the boom is within a third angle range. For example, the first angle range may be within 0 degree to 15 degrees, the second angle range may be within 15 degrees to 25 degrees, and the third angle range may be within 25 degrees to 45 degrees.

In example embodiments, an image processing condition in the image processing device 200 may be set through the input portion 400. For example, the image processing condition may include a location, a size, etc. of the transparency processing area. As the transparency processing area is determined, the transparency switching position of the first and second images, the transparency processing area in the entire display area of the display device 300, and the like may be set. For example, the transparency switching position may represent a boundary position of the transparency processing area, and when the bucket 30 moves to be located at the boundary of the transparency processing area, the bucket 30 may be considered to be located at a predetermined position for transparency switching. The size and location of the transparency processing area, the transparency switching timing, etc. may be fixedly set by a manufacturer according to a type of equipment, and may be freely changed and set by the operator or maintenance personnel.

For example, the input portion 400 may be implemented in a form of an instrument panel option, and the operator may change the timing point for the transparency switching, the area to be processed for transparency, and the like through the input portion 400.

As mentioned above, when the transparency processing area and the transparency switching timing are set, the display device 300 may display an image by dividing the image captured by the camera portion into the transparency processing area R and an external area of the transparency processing area R. The display device 300 may additionally display an outline of the transparency processing area R such that the transparency processing area R can be distinguished, or may not display the outline of the transparency processing area and may display the transparency-processed image to be connected to an image of the external area of the transparency processing area R.

Additionally, the display device 300 may display the first image in the external area of the transparency processing area R, and may display a transparency image in which at least one of the first image and the second image is displayed as a focus according to the progress of the transparency processing, within the transparency processing area R.

For example, when the bucket 30 is located in the external area of the transparency processing area R, the display device 300 may display only the first image that interconnects the transparency processing area R and the external area of the transparency processing area R. Alternatively, a transparency-processed image in which the first image is displayed as a focus may be displayed within the transparency processing area R. In this case, the operator may recognize that the display device 300 displays the first image as a whole due to the transparency image in which the first image is displayed as the focus. Additionally, when at least a portion of the bucket 30 is located within the transparency processing area R, the display device 300 may display a transparency-processed image in which the second image is displayed as a focus or the second image within the transparency processing area R, and may display the first image in which only the image in the transparency processing area R is excluded, in the external area of the transparency processing area.

In example embodiments, the transparency processor 230 may determine the position of the transparency processing area in the synthesized image according to the refraction angle information of the front vehicle body obtained from the angle information detection portion 150. The transparency processor 230 may adjust the position of the transparency processing area according to the steering hinge angle θs of the front vehicle body calculated by the steering angle calculator 210.

The position of the transparency processing area may be adjusted to follow the calculated steering hinge angle. As the stroke of the steering cylinder is changed by the steering device, the front vehicle body 12 may be bent to the left (or right), and at this time, the front working apparatus including the boom 20 and the bucket 30 may deviate from the initially set transparency processing area to obscure the front view. In case of the steering cylinder displacement sensor, the steering angle calculator 210 may convert the stroke value of the steering cylinder into the steering hinge angle. The transparency processor 230 may automatically change the position of the transparency processing area to follow the converted steering hinge angle.

As illustrated in FIGS. 6 to 8, when a portion of the boom or the bucket is positioned in the transparency processing area R of the first image M1, a portion of the second image may be cropped based on the first image, and then, the cropped image of the second image may be synthesized with the first image.

First, the position of the transparency processing area R may be set according to the detected posture (position of the boom or bucket) of the work apparatus and the refraction angle information of the front vehicle body. In FIGS. 6 to 8, for convenience of explanation, the first image captured by the upper camera, the second image captured by the lower camera and the synthesized image when the construction machinery is in the straight traveling state (state A) in FIG. 3 are illustrated. In this case, the transparency processing area R may be located at an initial position, for example, in the center of the screen of the display device 300.

Then, as illustrated in FIG. 7, a partial region in the second image corresponding to the transparency processing area may be determined as a crop region CR, and a crop image may be extracted based on the determined crop region CR. Then, the transparency of a region in the first image of FIG. 6 corresponding to the transparency processing area R may be adjusted. The transparency of the region the first image corresponding to the transparency processing area R may be adjusted to, for example, 180/255 level. In this case, the transparency of the cropped image extracted from the second image may not be adjusted.

Then, as illustrated in FIG. 8, the cropped image extracted from the second image may be synthesized in the transparent processing region R of the first image. In this case, when the area of the crop region CR is smaller than the area of the transparent processing region R in the first image, the crop image may be enlarged and the enlarged crop image may be synthesized with the first image.

If there is a person O in front of the wheel loader, in the first image of FIG. 6, the person O cannot be accurately identified because the person is covered by the boom or bucket, but in the second image of FIG. 7, the person O can be identified. The cropped image extracted from the second image of FIG. 7 may include an image of the person O. Since the cropped image is synthesized into the region corresponding to the transparency processing area of the first image, the image of the person O extracted from FIG. 7 can be identified in the transparency processing area of the synthesized image of FIG. 8. Accordingly, the forward field of view limited by the working apparatus may be improved.

In FIG. 3, when the construction machinery is in the left or right steering state, the transparency processing area R may move to the left or right side in the screen of the display device 300 according to the refraction angle information of the front vehicle body. In this case, the position of the transparency processing area R may be moved to the left or right according to the refraction angle information, and at least one of the first image and the second image may be processed to be transparent in the moved transparency processing area R.

In example embodiments, the image processing device 200 may recognize a person or other object (equipment, vehicle, etc.) from the first image, the second image and the synthesized image, and may process that the recognized object is displayed with a mark such as a bounding box (D in FIG. 8) or an outline of the recognized object is displayed with a dotted line or the like.

The image processing device 200 may compare an actual image in the image with a learning image of the object stored in the storage portion 250, and when it is determined that the actual image and the learning image of the object are the same as each other, the object may be recognized. Here, the learning image of the object may include images stored by machine learning various shapes photographed by a camera. Machine learning may be a field of artificial intelligence and may refer to an algorithm that enables a processing device such as a computer to learn.

Hereinafter, a method of controlling construction machinery using the control system for construction machinery in FIG. 4 will be explained. The following description will also be described based on the wheel loader as in the above-described method.

Figure 9:
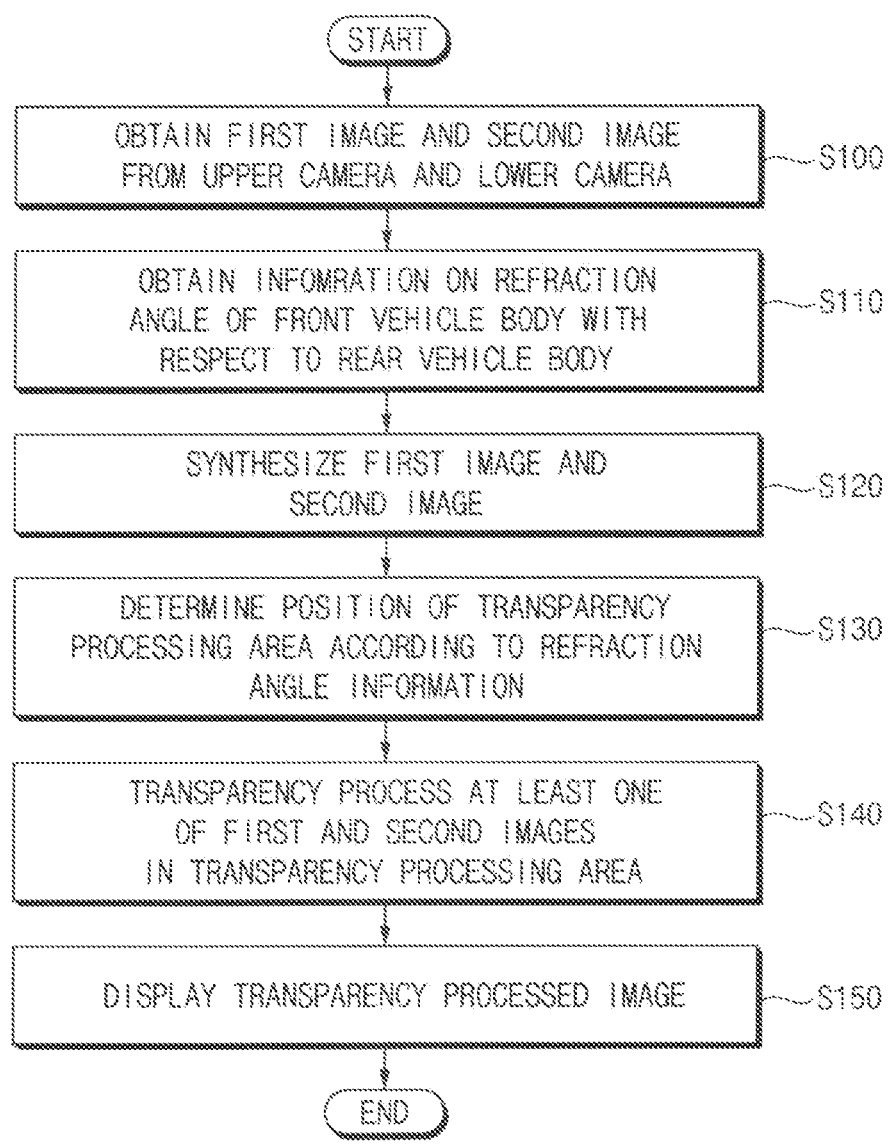
FIG. 9 is a flow chart illustrating a control method for a wheel loader in accordance with example embodiments.
Figure 10:
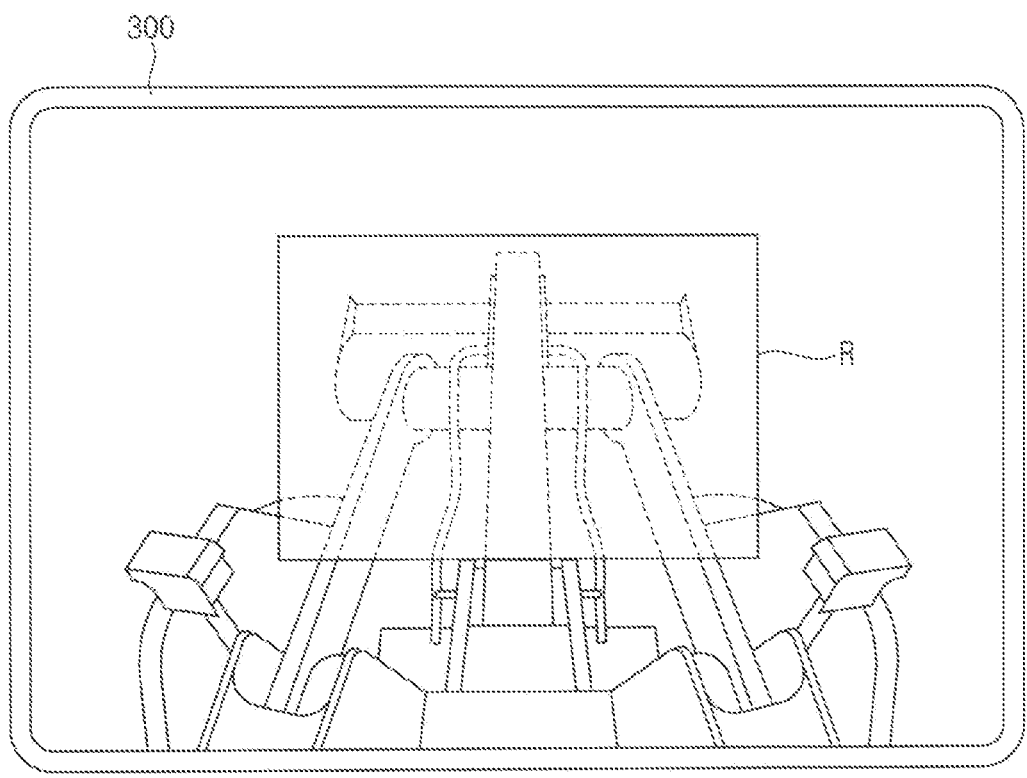
FIG. 10 is a view illustrating a screen on which a first image captured by an upper camera is displayed on a display device in a cabin when the construction machinery travels straight ahead (state A) in FIG. 3.
Figure 11:
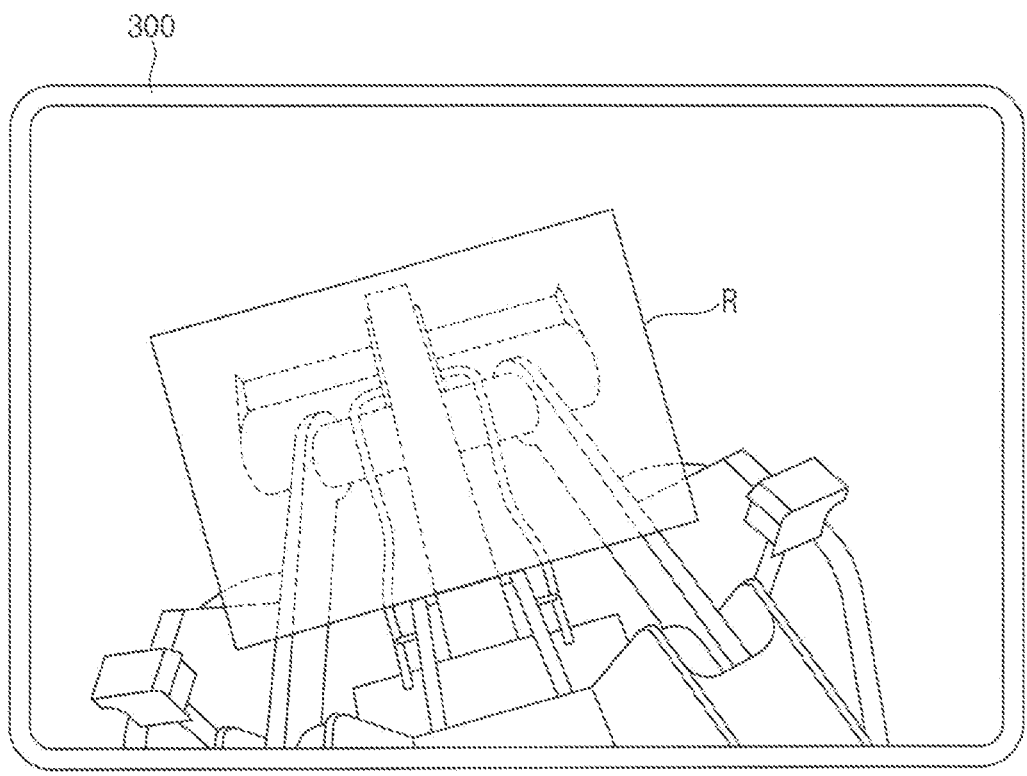
FIG. 11 is a view illustrating a screen on which the first image captured by the upper camera is displayed on the display device in the cabin when the construction machinery is steered to the left (state B) in FIG. 3.

FIG. 9 is a flow chart illustrating a control method for a wheel loader in accordance with example embodiments. FIG. 10 is a view illustrating a screen on which a first image captured by an upper camera is displayed on a display device in a cab when the construction machinery travels straight ahead (state A) in FIG. 3. FIG. 11 is a view illustrating a screen on which the first image captured by the upper camera is displayed on the display device in the cabin when the construction machinery is steered to the left (state B) in FIG. 3.

Referring to FIGS. 1 to 11, first, a first image IM1 and a second image IM2 may be obtained respectively through an upper camera 110 and a lower camera 120 installed in a wheel loader 10 (S100), and a refraction angle information of a front vehicle body 12 with respect to a rear vehicle body 14 may be obtained (S110). The first image IM1 and the second image IM2 may be synthesized into one image (S120), and a position of a transparency processing area may be determined according to the refraction angle information (S130).

In example embodiments, the first image IM1 for the front of a driver cabin 40 may be obtained using the first camera 110 installed in the driver cabin 40. The second image IM2 for the front of the front vehicle body 12 may be obtained using the second camera 120 installed in the front vehicle body 12.

The first image may be an image captured with a focus on a front upper region of the wheel loader through the upper camera 110, and the second image may be an image captured with a focus on a front lower region through the second camera 120. A first vertical viewing angle θv1 of the upper camera 110 and a second vertical viewing angle θv2 of the lower camera 120 may be set to partially overlap and a first horizontal viewing angle θh1 of the upper camera 110 and a second horizontal viewing angle θh2 of the lower camera 120 may be set to partially overlap, the first image and the second image may partially overlap each other.

For example, the upper camera 110 may be installed to coincide with or to be at the rear of a central axis (steering central axis) of the center pin 16, and the lower camera 120 may be installed to be in the front of the central axis of the center pin 16. Since the upper camera 110 and the lower camera 120 are installed at different positions with respect to the steering center axis, as illustrated in FIG. 3, when the left (or right) refraction of the front vehicle body 12 is performed, the direction at which the upper camera 110 looks and the direction at which the lower camera 120 looks may be different from each other.

In example embodiments, the refraction angle information of the front vehicle body 12 with respect to the rear vehicle body 14 may be obtained from an angle information detection portion 150. The angle information detection portion 150 may include a sensor for detecting the refraction angle information of the front vehicle body 12 with respect to the rear vehicle body 14 by a steering device. The detection value from the sensor may be transmitted to an image processing device 200 through a CAN network.

In example embodiments, the image processing device 200 may match the first image IM1 and the second image IM2 to synthesize the first image and the second mage into one image. Additionally, the image processing device 200 may a steering hinge angle θs of the front vehicle body 12 from the refraction angle information obtained by the angle information detection portion 150.

A steering angle calculator 210 of the image processing device 200 may determine the steering hinge angle θs of the front vehicle body 12 from the refraction angle information detected by the angle information detection portion 150. The steering angle calculator 210 may convert the detection value from the angle information detection portion 150 into the steering hinge angle using a conversion table stored in a storage portion 250.

A transparency processor 230 of the image processing device 200 may determine a position of the transparency processing area in the synthesized image according to the refraction angle information of the front vehicle body obtained from the angle information detection portion 150. The transparency processor 230 may adjust the position of the transparency processing area according to the steering hinge angle θs of the front vehicle body calculated by the steering angle calculator 210.

The image processing apparatus 200 may set a portion of the first image IM1 from the upper camera 110 as a first synthesis region, may set a portion of the second image IM2 from the lower camera 120 as a second synthesis region, may translucently process the second synthesis region of the second image IM2, and may the translucently processed second synthesis region may be synthesized with the first synthesis region of the first image IM1.

As illustrated in FIG. 10, when the wheel loader 10 travels straight, the transparency processor 230 of the image processing device 200 may maintain the position of the transparency area R as an initial position to follow the calculated steering hinge angle.

Additionally, in the transparency processing area, a portion in any one selected from the first image and the second image captured by the upper camera 110 and the lower camera 120 or portions of the first and second images may be processed to be transparent. For example, a portion of the image including the boom or bucket of the front working apparatus may be selectively processed to be transparent in the transparency processing area.

As illustrated in FIG. 11, when the front vehicle body 12 is refracted to the left by the steering device, the front working apparatus including the boom 20 and the bucket 30 may deviate from the initially set transparency processing area, so that the front view is obscured. At this time, the steering angle calculator 210 of the image processing device 200 may calculate the steering hinge angle θs from the detection value from the angle information detection portion 150, and the transparency processor 230 of the image processing device 200 may automatically change the position of the transparency processing area R to follow the calculated steering hinge angle.

Then, at least one of the first and second images may be transparency processed in the transparency processing are R (S140), and the transparency-processed synthesized image may be displayed through the display device 300 (S150).

In example embodiments, a posture of the front working apparatus may be detected. A rotation angle of a boom 20 connected to the front vehicle body 12 may be detected. Information on a position of a bucket 30, that is, a height of the bucket 30 from the ground may be detected by a boom angle sensor 24. An elevated height of the bucket may be determined from the rotation angle of the boom 20 detected by the boom angle sensor 24.

In example embodiments, an image portion of the boom or bucket that is a portion of the front working apparatus among the first and second images in the transparency processing area R may be selectively processed to be transparent (S140), and the transparency-processed synthesized image may be displayed through the display device 300 (S150).

In the transparency processing area R, an outline of an exterior of the boom or bucket of the transparency-processed first and second images may be displayed with a line, a dotted line, or a shade, so that only the shape can be identified.

The outline of the boom or bucket displayed in the transparent processing area R may be taken from the image taken from the actual first image or the second image, and may be matched with the movement of the boom or bucket according to the actual operation of a driver.

In example embodiments, the image processing device apparatus 200 may recognize an object in the first image or the second image which are to be transparency-processed, and may process that an outline of the recognized object is displayed with a dotted line or the like, or the recognized object is displayed with a notation such as a bounding box. For example, a computing device may identify an object in an image based on a predetermined algorithm or the like, and may generate a synthesized image by displaying an outline of the object. In this case, the driver may simply check a partial shape of the transparency-processed wheel loader 200 by using a dotted outline or the like.

As illustrated in FIG. 2, the rotation angle of the boom 20 may be an angle θ between an extension line L at the lowest position (0%) of the boom 20 and an extension line R at an elevated position of the boom 20. The rotation angle of the boom 20 at the highest position of the boom 20 (max boom height) is θmax.height, and in this case, the bucket position may be the maximum height (100%).

Then, whether or not the bucket position is lower than a predetermined position (transparency switching position) may be determined. The predetermined position may be the transparency switching position which is the boundary of the transparency processing area. That is, the comparison between the position of the bucket and the predetermined position may include checking whether a portion of the bucket 30 or the boom 20 is located within the transparency processing area R. When the bucket or the boom is lower than the predetermined position, the second image in the synthesized image may be transparency processed, and when the bucket or the boom is higher than the predetermined position, the first image in the synthesized image may be transparency processed. Here, the predetermined position may be a lower boundary of the predetermined transparency processing area R based on an image displayed through the display device 300. Then, the transparency-processed synthesized image may be displayed through the display device 300. In this case, the display device 300 may display the first image in an external area of the transparency processing area R.

In example embodiments, the image processing device 200 may perform transparency processing at least one of the first and second images to be transparent in the synthesized image according to the detected boom position.

The transparency processor 230 may transparency-process the first and second images to be transparent only in the transparency processing area R, that is, a partial area of the entire display area of the display device 300. The transparency processing area R may be defined to include an area in which the front view is obscured by the front work apparatus including the elevating boom 20 and the bucket 30.

In the transparency processing, the portions of the first image and/or the second image within the transparency processing area R of the synthesized image may be removed or translucently processed to overlap the background image, or an outline of an exterior of the first image and/or the second image may be two-dimensionally drawn with a line or dotted line so that only the shape may be identified. For example, the portions of the first image or the second image in the transparency processing area may be removed from the synthesized image using an alpha blending technique.

When the bucket 30 or the boom 20 is positioned between the lowest position (0%) and the predetermined bucket or boom position, the second image captured from the lower camera 120 may be transparency-processed, so that an object implemented by the upper camera 110 may be displayed as a main point (focus) within the transparency processing area R of the display device 300. When the bucket 30 or the boom 20 is in a relatively low position, a portion of the front work apparatus obscuring the front view in the second image may be transparency-processed so that the object may be identified in the synthesized image.

When the bucket 30 or the boom 20 is positioned between the predetermined position and the highest position (100%), the first image captured from the upper camera 110 may be transparency-processed, so that an object implemented by the lower camera 120 may be displayed as a main point (focus) within the transparency processing area R of the display device 300. When the bucket 30 or the boom 20 is in a relatively high position, a portion of the front work apparatus obscuring the front view in the first image may be transparency-processed so that the object may be identified in the synthesized image.

For example, the predetermined position of the boom may be set such that the rotation angle θ of the boom 20 is within a range of 15 degrees to 20 degrees.

Alternatively, the second image in the synthesized image may be transparency-processed to be transparent when the rotation angle θ of the boom is within a first angle range, the first and second images in the transparency processing area of the synthesized image may be transparency-processed to be transparent when the rotation angle θ of the boom is within a second angle range, and the first image in the synthesized image may be transparency-processed to be transparent when the rotation angle θ of the boom is within a third angle range. For example, the first angle range may be within 0 degree to 15 degrees, the second angle range may be within 15 degrees to 25 degrees, and the third angle range may be within 25 degrees to 45 degrees.

In example embodiments, an image processing condition for transparency processing the first and second images may be set. The image processing condition in the image processing device 200 may be set through an input portion 400. For example, the image processing condition may include a location, a size, etc. of the transparency processing area. A transparency switching timing of the first and second images may be determined based on the position of the bucket 30 or the bucket 20 and the predetermined bucket or boom position. The transparency processing area may be selected according to a type of equipment.

For example, the input unit 400 may be implemented in a form of an instrument panel option, and the operator may change the timing point for the transparency switching, the area to be processed for transparency, and the like through the input portion 400. The input portion 400 may be provided in a form of a separate manipulation device provided in the driver cabin, a manipulation device integrally provided with the display device, or a touch screen constituting a display screen of the display device. Thus, the operator may set various image processing conditions such as setting a periphery of an object requiring attention during work as the transparent processing area.

As mentioned above, the first image and the second image captured from the upper camera 110 installed in the driver cabin 40 of the wheel loader 10 and the lower camera 120 installed in the front vehicle body 12 may be synthesized into one image, the position of the transparent processing region R in the synthesized image may be determined according to the steering hinge angle θs of the front vehicle body 12, at least one of the first and second images may be transparency-processed to be transparent in the synthesized image according to the position of the bucket 30 or the boom 20 connected to the front vehicle body 12, and the transparency-processed image may be displayed through the display device 300.

When the bucket 30 or the boom 20 is in a relatively low position between the lowest position (0%) and the predetermined bucket position, in the second image captured from the lower camera 120, the front view of the front vehicle body 12 may be obscured by the front work apparatus including the boom 20 and the bucket 30. When the bucket 30 is in a relatively high position between the predetermined bucket position and the highest position (100%) of the transparency processing area, in the first image captured from the upper camera 110, the front view of the front vehicle body 12 may be obscured by the front work apparatus including the boom 20 and the bucket 30.

The first image and/or the second image may be transparency-processed in the synthesized image according to the position of the bucket 30 or the boom 20, to remove a blind spot that is obscured by the front work apparatus.

Further, since the mounting positions of the upper camera 110 and the lower camera 120 are different from each other, when the construction machinery is steered to the left or right, the bucket 30 may deviate from the initially set transparent processing area R. When the wheel loader 10 is steered, the steering hinge angle θs of the front vehicle body 12 may be determined according to the refraction angle information of the front vehicle body 12 with respect to the rear vehicle body 14, and in the image in which the first image IM1 and the second image IM2 are synthesized, the image may be processed so that the position of the transparent processing region R is changed to be matched to the steering hinge angle θs.

Accordingly, it may be possible to prevent the front view from being obscured by the front working apparatus including the boom 20 and the bucket 30 event when the wheel loader 10 is steered. Thus, the operator's cognitive ability may be increased to secure stability, to thereby prevent safety accidents.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A control system for construction machinery, the control system comprising:
    an upper camera installed in a driver cabin of a rear vehicle body to capture a first image of a front of the driver cabin;
    a lower camera installed in a front vehicle body rotatably connected to the rear vehicle body to capture a second image of a front of the front vehicle body;
    an angle information detection portion configured to detect information on a refraction angle of the front vehicle body with respect to the rear vehicle body;
    an image processing device configured to
        synthesize the first and second images into one image,
        determine a position of a transparency processing area in the synthesized image according to the refraction angle information, and
        transparency-process at least one of the first image or the second image in the transparency processing area; and
    a display device configured to display the synthesized image transparency-processed by the image processing device, the transparent processing area being displayed at a portion of an entirety of a display area of the display device,
    wherein
    the image processing device includes:
        a steering angle calculator configured to determine a steering hinge angle of the front vehicle body from the refraction angle information obtained by the angle information detection portion; and
        a transparency processor configured to determine the position of the transparency process area in the synthesized image according to the determined steering hinge angle, and
    the transparency processor is configured to, in response to refraction of the front vehicle body, change the determined position of the transparency processing area displayed at the portion of the entirety of the display area of the display device without aligning the upper camera or the lower camera before the refraction of the front vehicle body to follow the determined steering hinge angle of the front vehicle body.

2. The control system of claim 1, wherein the steering angle calculator is configured to convert a detection value obtained from the angle information detection portion into the steering hinge angle of the front vehicle body.

3. The control system of claim 1, wherein the angle information detection portion includes a center pin angle sensor, a steering cylinder displacement sensor, or a gyro sensor.

4. The control system of claim 1, further comprising:
a work apparatus posture detection portion configured to detect a posture of a front work apparatus, and
wherein the image processing device is configured to transparency-process the at least one of the first image or the second image in the synthesized image according to the posture of the front work apparatus detected by the work apparatus posture detection portion.

5. The control system of claim 4, wherein
the image processing device is configured to transparency-process the first image in the synthesized image in response to at least a portion of the front work apparatus invading a predetermined position corresponding to the transparency processing area, and
the image processing device is configured to transparency-process the second image in the synthesized image in response to the work apparatus not invading the predetermined position.

6. The control system of claim 1, further comprising:
an input portion configured to set an image processing condition in the image processing device.

7. The control system of claim 6, wherein the image processing condition includes a transparency processing switching timing of the first and second images or the transparency processing area of an entirety of the display area of the display device.

8. The control system of claim 1, wherein the image processing device is configured to process that, in the transparency processing area, an outline of an exterior of a boom or a bucket of the transparency-processed first and second images is displayed with a line or a dotted line.

9. The control system of claim 8, wherein the outline of the transparency-processed boom or bucket is displayed by transparency-processing an image of the boom or bucket that is taken from the first image or the second image.

10. The control system of claim 1, wherein the image processing device is configured to selectively transparency-process an image of a boom or a bucket coupled to the front vehicle body in the first and second images in the transparent processing area.

11. The control system of claim 1, wherein the synthesized image includes an object recognized by the image processing device in the first image and the second image.

12. The control system of claim 1, wherein the image processing device is configured to recognize a person, animal, building or equipment as an object through a predetermined algorithm.

13. The control system of claim 1, wherein the image processing device is configured to
extract a crop image from any one of the first and second images,
transparency-process a partial region in the other one of the first and second images, and
place the extracted crop image in the transparency-processed region to create the synthesized image.

14. The control system of claim 13, wherein the transparency-processed partial region corresponds to the transparency processing area.

15. The control system of claim 1, wherein the image processing device is configured to
set a portion of the first image as a first synthesis region,
set a portion of the second image as a second synthesis region,
translucently process the second synthesis region of the second image, and synthesize the translucently processed second synthesis region with the first synthesis region of the first image to create the synthesized image.

16. A method of controlling construction machinery, the method comprising:
capturing, by an upper camera installed in a driver cabin of a rear vehicle body, a first image of a front of the driver cabin;
capturing, by a lower camera installed in a front vehicle body rotatably connected to the rear vehicle body, a second image of the front of the front vehicle body;
detecting, by an angle information detection portion, information on a refraction angle of the front vehicle body with respect to the rear vehicle body;
synthesizing, by an image processing device, the first and second images into one image;
determining, by the image processing device, a steering hinge angle of the front vehicle body from the refraction angle information;
determining, by the image processing device, a position of a transparency process area in the synthesized image according to the determined steering hinge angle;
transparency-processing, by the image processing device, at least one of the first image or the second image in the transparency processing area; and
displaying the transparency-processed image through a display device, the transparent processing area being displayed at a portion of an entirety of a display area of the display device,
wherein the method further comprises, in response to refraction of the front vehicle body, changing the determined position of the transparency processing area displayed at the portion of the entirety of the display area of the display device without aligning the upper camera or the lower camera before the refraction of the front vehicle body to follow the determined steering hinge angle of the front vehicle body.

17. The method of claim 16, wherein the determining the steering hinge angle of the front vehicle body from the refraction angle information includes converting, by the image processing device, a refraction angle detection value into the steering hinge angle of the front vehicle body.

18. The method of claim 16, wherein the obtaining the information on the refraction angle information of the front vehicle body with respect to the rear vehicle body includes using the angle information detection portion including a refraction angle detection sensor, and the refraction angle detection sensor includes a center pin angle sensor, a steering cylinder displacement sensor, or a gyro sensor.

19. The method of claim 16, further comprising:
detecting a posture of a front work apparatus, and
wherein the transparency-processing the at least one of the first image or the second image in the transparency processing area includes transparency-processing the at least one of the first image or the second image in the synthesized image according to the detected posture of the front work apparatus.

20. The method of claim 16, further comprising:
setting an image processing condition under which the at least one of the first image or the second image is transparency processed.

21. The method of claim 20, wherein the image processing condition includes a transparency processing switching timing of the first and second images or the transparency processing area of an entirety of the display area of the display device.

22. A method of controlling construction machinery, the method comprising:
- capturing, by an upper camera installed in a driver cabin of a rear vehicle body, a first image of a front of the driver cabin;
- capturing, by a lower camera installed in a front vehicle body rotatably connected to the rear vehicle body, a second image of the front of the front vehicle body;
- detecting, by an angle information detection portion, information on a refraction angle of the front vehicle body with respect to the rear vehicle body;
- determining, by an image processing device, a steering hinge angle of the front vehicle body from the refraction angle information;
- determining, by the image processing device, a position of a transparency process area in the first image according to the determined steering hinge angle;
- extracting, by the image processing device, a crop image by setting a partial region in the second image corresponding to the transparency processing area as a crop region;
- adjusting, by the image processing device, transparency of the transparency processing area of the first image;
- synthesizing, by the image processing device, the crop image extracted from the second image to the transparency processing area of the first image; and
- displaying the synthesized image through a display device, the transparent processing area being displayed at a portion of an entirety of a display area of the display device,
- wherein the determining the position of the transparency process area includes, in response to refraction of the front vehicle body, changing the determined position of the transparency processing area displayed at the portion of the entirety of the display area of the display device without aligning the upper camera or the lower camera before the refraction of the front vehicle body to follow the determined steering hinge angle of the front vehicle body.

23. The method of claim 22, wherein the synthesizing the extracted cropped image to the transparency processing area of the first image includes:
- adjusting a size of the crop image extracted from the second image; and
- synthesizing the adjusted crop image to the transparency processing area of the first image.

24. The method of claim 22, wherein the adjusting the transparency of the transparency processing area of the first image includes processing such that an outline of an exterior of a boom or a bucket is displayed with a line or a dotted line in the transparency processing area of the first image.

25. The method of claim 22, further comprising:
- recognizing, through a predetermined algorithm, a person, animal, building or equipment as an object in the synthesized image.

* * * * *